United States Patent

Chou

Patent Number: 6,095,092
Date of Patent: Aug. 1, 2000

[54] APPARATUS AND METHOD FOR CONFINING AN ANIMAL WITHIN A BOUNDARY

[76] Inventor: Wayne W. Chou, 25 Hauley Pl., Ridgefield, Conn. 06877

[21] Appl. No.: 09/252,480

[22] Filed: Feb. 18, 1999

[51] Int. Cl.[7] .................................................. A01K 15/04
[52] U.S. Cl. ........................................ 119/721; 119/908
[58] Field of Search ................................ 119/720, 721, 119/859, 908

[56] References Cited

U.S. PATENT DOCUMENTS

| | | | |
|---|---|---|---|
| 2,800,104 | 7/1957 | Cameron et al. | 119/728 |
| 3,753,421 | 8/1973 | Peck | 119/721 |
| 3,897,753 | 8/1975 | Lee et al. | 119/51.02 |
| 3,999,521 | 12/1976 | Puiello | 119/856 |
| 4,020,796 | 5/1977 | Grifa | 119/671 |
| 4,689,776 | 8/1987 | Thorndyke et al. | 367/139 |
| 4,745,882 | 5/1988 | Yarnall, Sr. et al. | 119/721 |
| 4,766,847 | 8/1988 | Venczel et al. | 119/721 |
| 4,898,120 | 2/1990 | Brose | 119/721 |
| 4,967,695 | 11/1990 | Giunta | 119/721 |
| 4,996,945 | 3/1991 | Dix, Jr. | 119/721 |
| 5,053,768 | 10/1991 | Dix, Jr. | 340/988 |
| 5,067,441 | 11/1991 | Weinstein | 119/721 |
| 5,103,769 | 4/1992 | Macintosh | 119/719 |
| 5,121,711 | 6/1992 | Aine | 119/721 |
| 5,134,277 | 7/1992 | Yerbury et al. | 350/214 RC |
| 5,161,485 | 11/1992 | McDade | 119/859 |
| 5,207,178 | 5/1993 | McDade et al. | 119/859 |
| 5,207,179 | 5/1993 | Arthur et al. | 119/721 |
| 5,241,923 | 9/1993 | Janning | 119/721 |
| 5,307,763 | 5/1994 | Arthur et al. | 119/719 X |
| 5,353,744 | 10/1994 | Custer | 119/719 |
| 5,379,726 | 1/1995 | Mann | 119/793 |
| 5,381,129 | 1/1995 | Boardman | 119/721 |
| 5,408,956 | 4/1995 | Quigley | 119/720 |
| 5,425,330 | 6/1995 | Touchton et al. | 119/721 |
| 5,435,271 | 7/1995 | Touchton et al. | 119/721 |
| 5,445,900 | 8/1995 | Miller, Jr. et al. | 429/1 |
| 5,450,063 | 9/1995 | Peterson et al. | 340/573 |
| 5,460,124 | 10/1995 | Grimsley et al. | 119/721 |
| 5,476,729 | 12/1995 | Miller, Jr. et al. | 429/1 |
| 5,533,469 | 7/1996 | Touchton et al. | 119/721 |
| 5,570,655 | 11/1996 | Targa | 119/51.02 |
| 5,575,242 | 11/1996 | Davis et al. | 119/721 |
| 5,576,694 | 11/1996 | Touchton et al. | 340/573 |
| 5,610,588 | 3/1997 | Yarnall, Jr. et al. | 340/573 |
| 5,640,932 | 6/1997 | Bianco et al. | 119/720 |
| 5,682,839 | 11/1997 | Grimsley et al. | 119/721 |
| 5,794,569 | 8/1998 | Titus et al. | 119/721 |
| 5,799,618 | 9/1998 | Van Curren et al. | 119/721 |
| 5,868,103 | 2/1999 | Boyd | 119/720 |

*Primary Examiner*—Peter M. Poon
*Assistant Examiner*—Elizabeth Shaw
*Attorney, Agent, or Firm*—Pollock Vande Sande & Amernick

[57] ABSTRACT

An animal control device, and method for confining an animal within a boundary identified by a current carrying conductor. The animal is equipped with a control device, as an antenna coil, which is coupled to a magnetic flux emanating from the conductor. When the animal approaches the boundary conductor, the change in voltage across the antenna coil is compared with a reference change in voltage. As the distance closes from a charging animal, the rate of change in voltage from the antenna coil increases correspondingly, providing a reliable detection of the animal's imminent crossing of the boundary. Conventional animal correction circuitry is provided which, in response to a detected voltage change, issues a corrective stimulus to the animal to stop the animal from crossing the boundary.

13 Claims, 6 Drawing Sheets ns within a specified boundary. Specifically, the invention increases the security of a boundary defined by a buried cable carrying an alternating current, which is used to discourage the animal from crossing the boundary.

APPARATUS AND METHOD FOR CONFINING AN ANIMAL WITHIN A BOUNDARY

RELATED APPLICATIONS

This application is related to U.S. patent application Ser. No. 08/941,649 filed Sep. 30, 1997 now abandoned.

BACKGROUND OF THE INVENTION

The present invention relates to systems for containing animals within a specified boundary. Specifically, the invention increases the security of a boundary defined by a buried cable carrying an alternating current, which is used to discourage the animal from crossing the boundary.

Electronic animal control systems to confine an animal within a predefined perimeter or boundary are in current use. The area of confinement is defined by a buried conductor which carries an alternating signal current. The animal, such as a household pet, carries a small receiving device connected to a collar which detects a magnetic flux emanating from the buried conductor. As the animal approaches the conductor, the magnetic field associated with the buried conductor induces a corresponding alternating current in a induction coil or antenna worn by the animal. As the animal approaches the buried conductor, the magnitude of the induced current increases, and when the voltage across the induction coil reaches a threshold voltage, the receiver will trigger an alarm, or electric shock to the animal to warn the animal that it is approaching the boundary.

These systems are widely popular, and are effective in most situations. However, in times of excitement, such as a dog chasing another animal, the dog may lunge across the boundary, as the corrective action is applied too late, or with a duration which is too short.

As an additional problem, the antenna or induction coil used to detect the presence of a magnetic field produced by the current in the buried conductor tends to be directional. Thus, if the animal approaches the conductor at the proper angle, it is possible that only a minimum amount of flux is coupled to the induction coil, and the receiver will fail to detect the resulting insignificant voltage. Thus, depending on how the animal approaches the boundary defined by the buried conductor, it may be possible to escape from the perimeter without receiving any warning stimulus.

As a solution for avoiding any null or insufficient signal as a result of the orientation of the induction coil antenna with respect to the buried cable, three orthogonal antennas may be used together, as shown in U.S. Pat. No. 5,425,330. The three antennas having the orthogonal orientation are sampled constantly, and the larger of the three signals produced from the antennas is utilized to detect the presence of the animal near the buried conductor. Even in the multiple antenna coil system, however, there still remains a significant difference in the detected signal strength for the range of orientations which the animal may have with respect to the buried conductor. While the problem may be reduced by including even more antenna coils, the increased number of antenna coils increases the cost, circuit complexity and bulk associated with the device.

SUMMARY OF THE INVENTION

It is an object of the invention to improve the security of an electronic animal confinement system.

It is a more particular object of this invention to reduce the effects of antenna coil orientation in an animal confinement system.

These and other objects of the invention are provided by an electronic animal confinement system which provides a more reliable method of detection of an animal's presence near the system boundary. The electronic receiving device worn by the animal detects the approach of the boundary conductor as an increased rate of change of the voltage induced in the receiving antenna coil. Thus, as the animal approaches the perimeter wire, the sensed current increases as the distance to the buried conductor decreases. The change in voltage across the antenna coil per unit of time is used to activate sensory stimulation circuitry for correcting the animal's behavior. By utilizing a voltage versus time function generated by the animal's approach to the boundary as the relative criteria for activating the stimulation circuitry, the effect of antenna coil orientation is minimized.

In a preferred embodiment of the invention, the receiving circuitry also detects the absolute amplitude of the voltage induced in the receiver antenna coil. In the event that the orientation of the antenna coil produces a minimal change in the detected voltage per unit of time, the absolute amplitude voltage is utilized to trigger the behavior correction stimulus.

Sensing of the rate of change of induced voltage as the criteria for effecting a behavioral correction will initiate a corrective action earlier in time than the prior art amplitude detection system. The activity of the animal, such as a chase, is monitored and acted on by the receiving device. As the animal approaches the buried conductor, the rate of increase in induced voltage increases significantly with its speed as well as its proximity to the buried conductor. Thus, it is possible using the change in voltage function to permit the animal to run when it is not adjacent the boundary conductor. However, if he approaches the boundary conductor the change in voltage function increases rapidly, and the behavioral correction is administered much sooner with little effect from antenna coil orientation.

DESCRIPTION OF THE PREFERRED EMBODIMENTS

Figure 1:
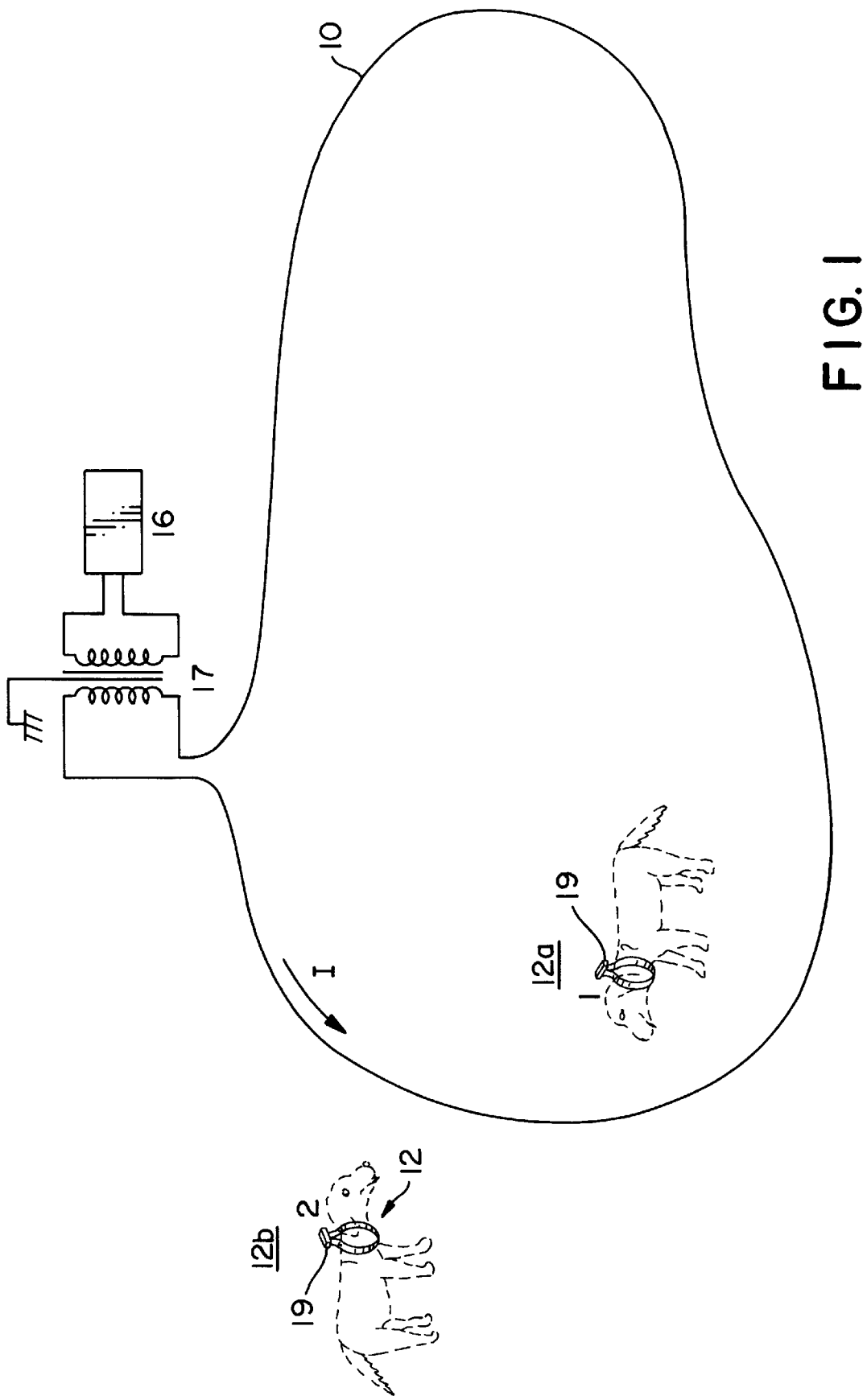
FIG. 1 shows the electronic animal confinement system with which the present system is implemented.

FIG. 1 represents the system for confining animals in accordance with one embodiment of the invention. The output signal from signal generator 16 is coupled by transformer 17 to the buried conductor 10 which carries alternating current signal 1.

An animal wearing a collar having a receiver 19 supported thereon is confined within the boundary of buried conductor 10. As the animal approaches the boundary 10, the receiver 19 detects an induced voltage when receiver 19 enters the magnetic flux field produced from conductor 10.

In the prior art systems, the receiver 19 was directionally sensitive with respect to the boundary conductor 10. Depending on the angle of approach of the animal to the conductor 10, it is possible for the receiver to be positioned so that very little voltage is detected from the magnetic flux field of the conductor 10. As noted previously, the prior art electronic confinement systems tend to solve this problem by including multiple or orthogonal antennas which assume a different position with respect to the conductor 10.

Additionally, it is noted that the animal 19, when charging the boundary 10, in pursuit of another animal for instance, can cross the boundary 10 before the stimulation circuitry of the receiver 19 has been activated, thus resulting in the animal assuming the position 12b outside the boundary conductor 10.

Figure 2:
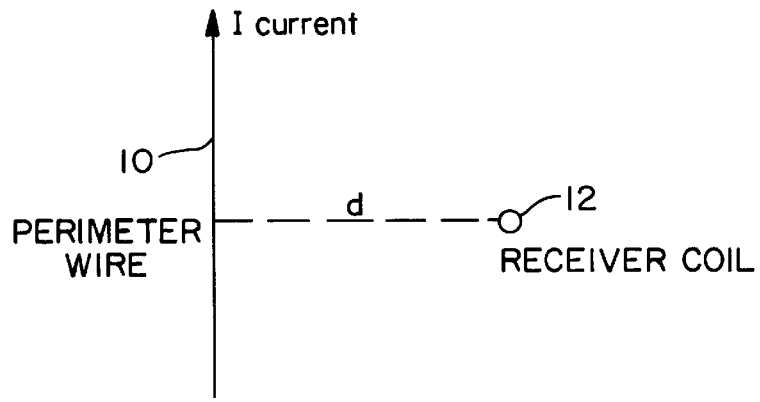
FIG. 2 illustrates the relationship between the receiver coil 12 and the boundary conductor 10.
Figure 3:
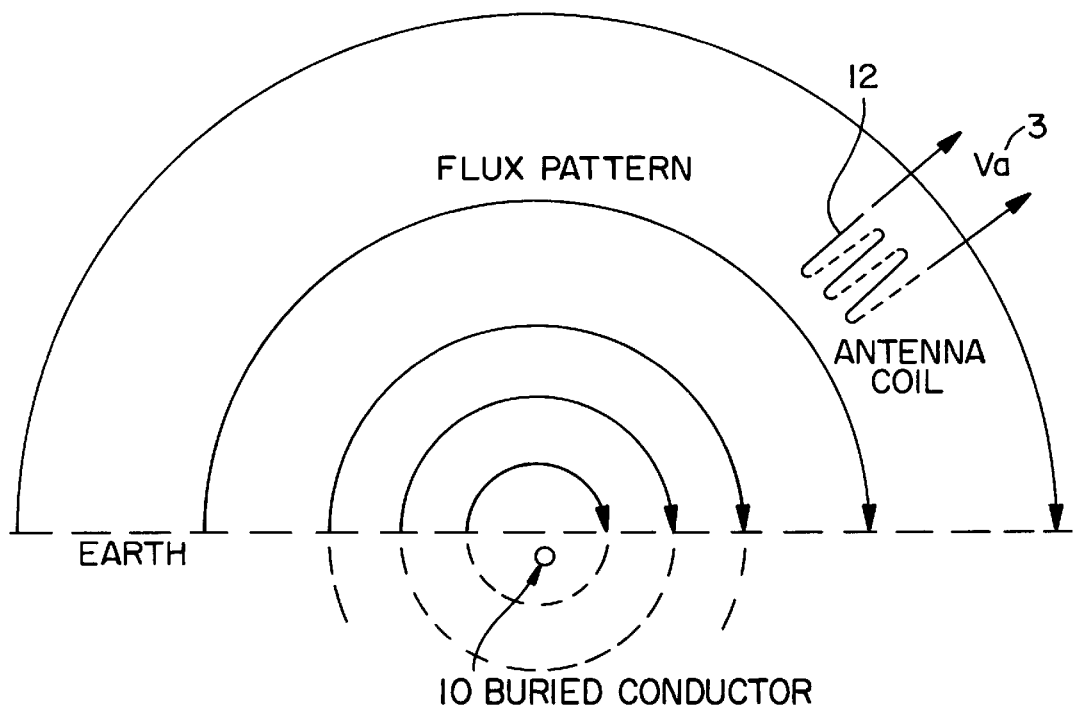
FIG. 3 shows the magnetic flux pattern created by the boundary conductor 10 with respect to the antenna coil 12 of the receiver.
Figure 4:
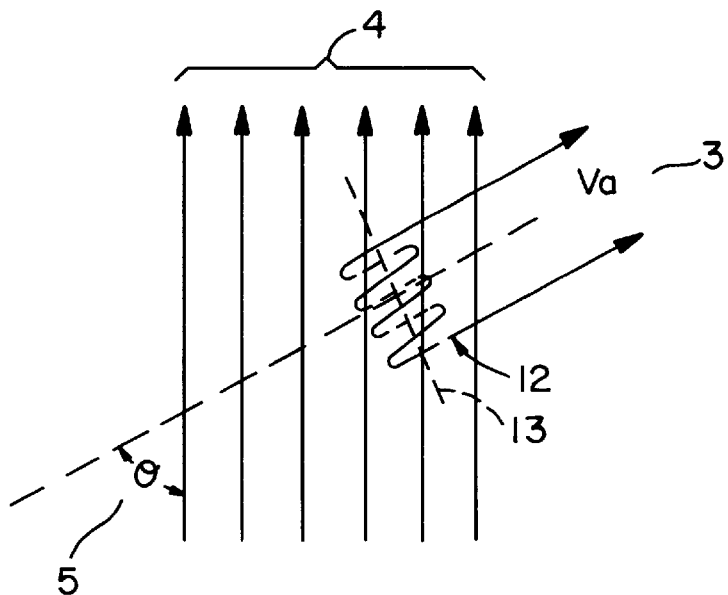
FIG. 4 shows the effects of orientation of the antenna coil 12 with respect to the magnetic flux field.
Figure 5:
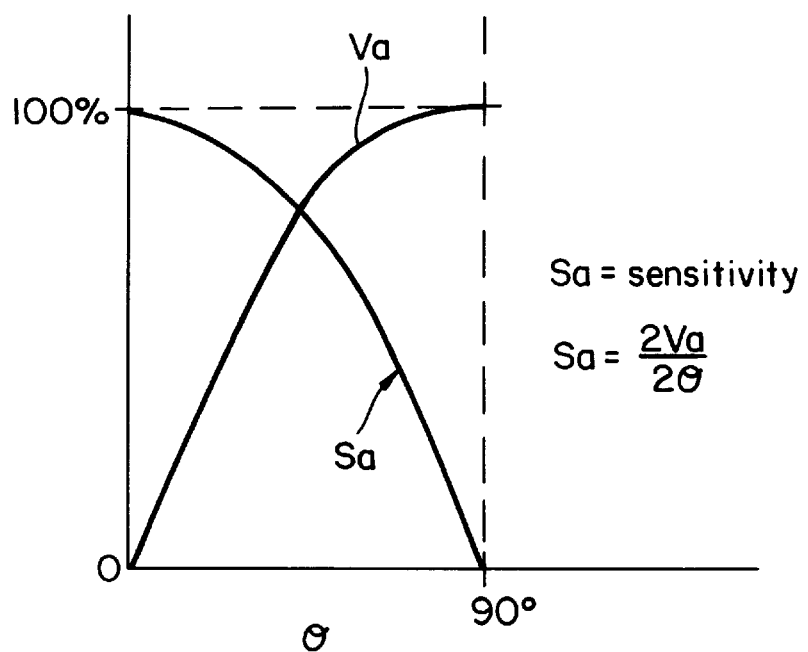
FIG. 5 shows the change in detection sensitivity as well as detection voltage across the antenna coil 12 terminals.

Referring to FIGS. 2 and 3, the position of the receiver 19 having an antenna induction coil 12 is shown with respect to the boundary conductor which is buried below the surface of the earth. A magnetic flux pattern is produced from the boundary conductor which essentially surrounds the conductor, and produces a voltage in the antenna induction coil 12 of the animal's receiver 19. As shown in FIG. 4, the antenna induction coil 12 may assume an angle with respect to the flux lines emanating from the boundary conductor 10, and the induced current within the antenna induction coil 12 changes as a function θ. FIG. 5 illustrates the voltage induced across the terminals of antenna induction coil 12 as the angle of the induction coil axes changes. When the axis 13 of the antenna induction coil 12 is parallel to the magnetic field, θ is equal to 90° and the detected voltage across the terminals of induction coil 12 is at a maximum. As θ approaches zero, wherein the axes of the induction coil 12 is perpendicular to the flux lines 4 of the magnetic field, the voltage across the terminals of induction coil 12 is at a minimum theoretical zero value.

The figures demonstrate that if the animal approaches the boundary conductor such that the antenna coil 12 is perpendicular to the flux lines, little or no current can be induced in the coil, making detection of the animal's presence near the boundary improbable.

FIG. 5 also shows a sensitivity factor, representing the change in the induced voltage signal versus a change in angle (dv/dθ). Although the amount of signal received by the coil is small when the coil is essentially parallel to the magnetic flux, the percentage change in induced voltage is much larger compared to the percentage change in signal when the coil is fully coupled to the flux field. Thus, the maximum sensitivity (dv/dt) occurs when the antenna coil 12 is at the angle of minimum coupling.

Figure 6:
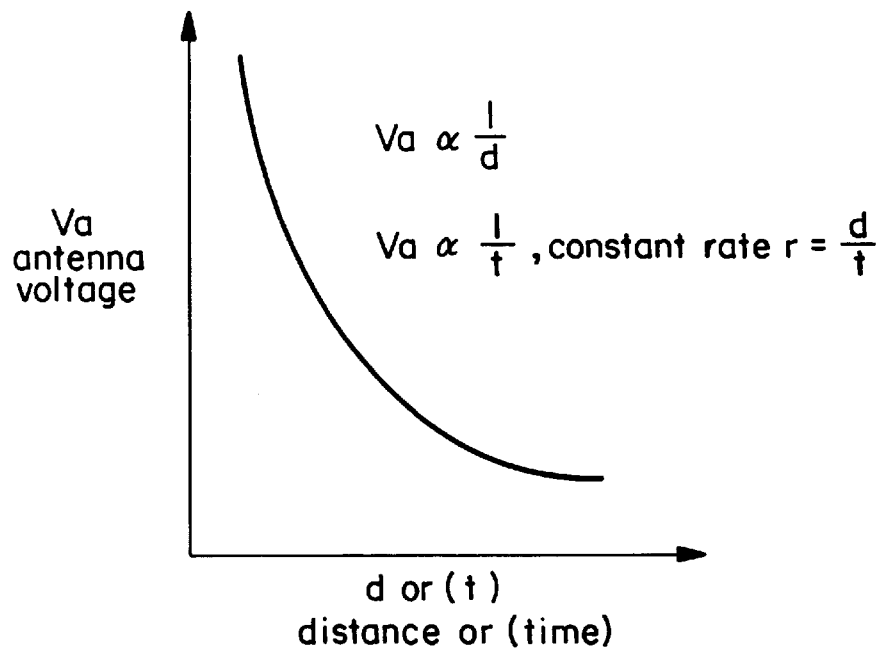
FIG. 6 illustrates the antenna voltage as a function of distance from the boundary conductor.
Figure 7:
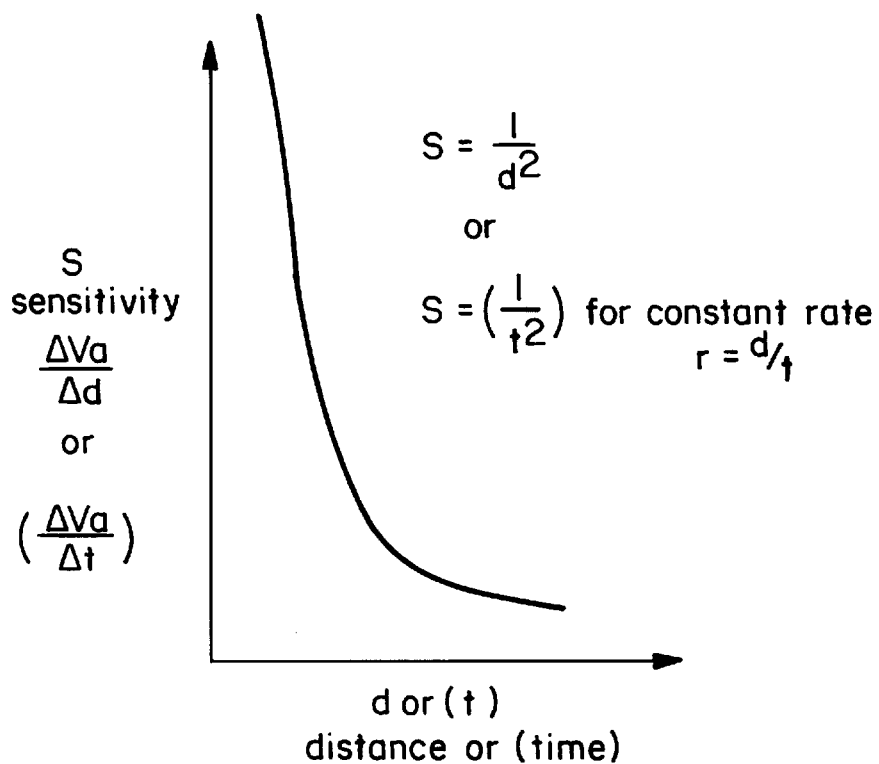
FIG. 7 shows the sensitivity function of the receiver device with respect to distance, or time of acceleration for the animal.

FIGS. 6 and 7 illustrate the effect on voltage induced across the antenna coil 12 terminals as the distance from the antenna coil and boundary wire 10 increases. If the animal is moving at a constant rate towards the boundary 10, as the distance (d) is reduced, the slope of the voltage versus distance curve increases very significantly. The strength of the voltage Va induced across the antenna coil is the inverse of the distance (d), and an animal wearing the antenna coil traveling at a constant rate toward the perimeter will experience an increase across the antenna coil terminals in accordance with FIG. 6. Accordingly, the representation of voltage versus distance will also, in the case of an animal moving at a constant rate, represent the voltage versus time across the antenna coil terminals.

FIG. 7 represents the slope, or derivative of the curve of FIG. 6. The slope of the voltage versus distance function dv/dd (which may also be represented as dv/dt), is shown to be very steep as the distance (d) from the antenna coil 12 to the buried conductor 10 decreases. Accordingly, by detecting the change in voltage per unit time, the dv/dt or its corresponding voltage function across the terminals of antenna coil 12, a viable indication of the animal's approach to the boundary conductor 10 may be detected.

The derivative of a voltage versus distance function, or voltage versus time function for an animal running at a constant rate, is proportional to $1/d^2$, and $1/t^2$. The function of FIG. 7 therefore represents an acceleration function, which may be effectively detected and used to initiate a corrective stimulus to the animal.

If the receiver 19 is set to trigger, at a predetermined threshold rate of increasing signal dv/dt, across the terminals of antenna coil 12, the closer the animal gets to the boundary, the greater will be the voltage function dv/dt and initiate a corrective stimulus will be initiated. If the animal decelerates, however, the voltage function will fall below the threshold and no stimulus will be applied if the rate of travel drops below that set for the threshold.

It should also be noted as the animal moves away from the boundary conductor 10, effective acceleration and movement is diminished, permitting the animal to run at full speed as long as he remains a predetermined distance from the boundary conductor 10.

The detection of the change in voltage versus time (dv/dt) also reduces the effect of antenna coil orientation on the detection reliability. As was noted with respect to FIG. 4, where the induced voltage is a minimum, changes in the induced voltage become a maximum. Further, any angular rotation of the antenna with respect to the conductor 10 will then increase the rate of change of the voltage across the terminals of the antenna coil, thereby reliably triggering a corrective stimulus in circumstances where a coupling of flux between conductor 10 and the antenna coil 12 are at a minimum.

The use of a stimulus threshold based on a rate of change of the voltage across the antenna coil (dv/dt) is an indication of the rate of approaching speed to the boundary conductor. Further, as the animal approaches the boundary conductor, the rate of approach which will trigger a corrective stimulus increases. Consequently, the animal is free to run as long as he remains at a defined distance from the boundary conductor. Thus, the animal will be kept conditioned not to charge the boundary 10.

Figure 8:
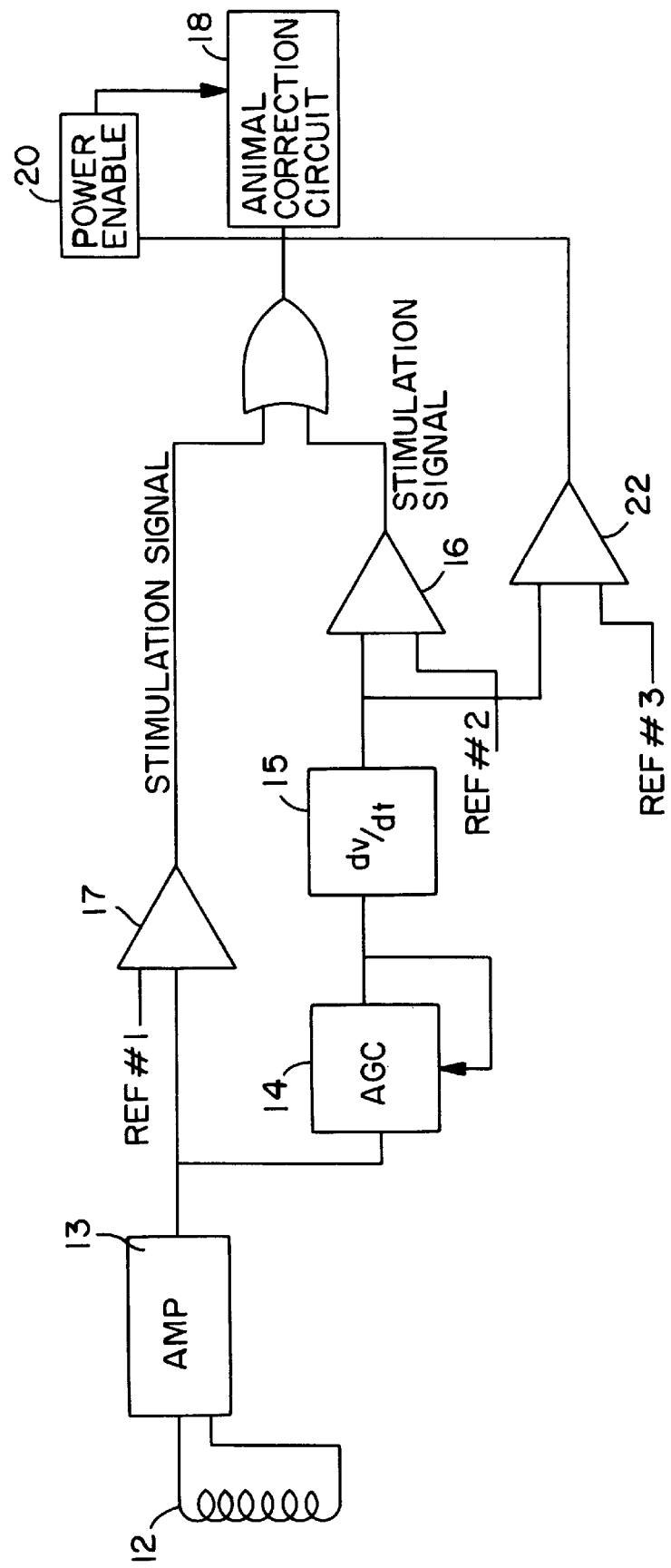
FIG. 8 illustrates a block diagram of a receiver for implementing the preferred embodiment of the invention.

FIG. 8 illustrates a block diagram of a receiver device worn by the animal which takes advantage of the foregoing rate change sensing feature. The antenna coil 12 is connected to amplifier 13, for amplifying the voltage and current produced from the output terminals of the antenna coil 12. The signal produced by amplifier 13 is applied to the first and second paths or processing. The first path may optionally include an AGC amplifier 14 which has a long term time constant for averaging the signal produced from amplifier 13. The change in voltage versus time is derived from a discriminator circuit 15, which effectively differentiates the signal produced from the antenna coil 12. The differentiated signal represents the slope, or change in voltage per unit of time, which as noted earlier corresponds to the change in voltage per unit of distance between the animal and the boundary conductor 10. A first threshold reference is applied to a comparator 16, which compares a voltage representing the rate of change of the antenna coil voltage signal to a reference voltage. If the detected voltage is greater than the reference voltage, the animal behavior correction circuit 18 is activated, to apply a stimulus to the animal for preventing the animal from leaving the area defined by the boundary conductor 10. As is known in the electronic confinement systems of the prior, the animal correction circuit 18 may apply either an audio stimulus to the animal, or an electric shock to modify his behavior.

The embodiment of FIG. 8 also utilizes amplitude detection of the absolute value of the voltage signal produced from antenna coil 12. In the event that the animal approaches the conductor 10 at an angle of minimum angular sensitivity for the device as shown in FIG. 5, the system will respond to an amplitude level of voltage induced across the terminals of antenna coil 12. Thus, the system operates to trigger on a change in voltage versus time, or an amplitude level, depending on the orientation of the antenna coil 12 with respect to the boundary conductor 10. Thus, detection blind spots which would occur if only one of the sensing techniques were employed are avoided.

The circuit of FIG. 8 may include a power savings circuit 20, which effectively powers the animal correction circuitry 18 only in the presence of a stimulation signal. In this way, the power can be conserved for the receiver device 19, so that only the front end of the receiver is maintained with power. It may also be advantageous to enable the power saving circuit 20 from a sensed voltage change dv/dt from circuit 15. In this embodiment, a third comparator 22 is provided, having a reference threshold 3 lower in value than reference threshold 2. In these circumstances, the power enable circuit 20 enables the animal correction circuit 18 prior to the generation of a stimulation signal.

Figure 9:
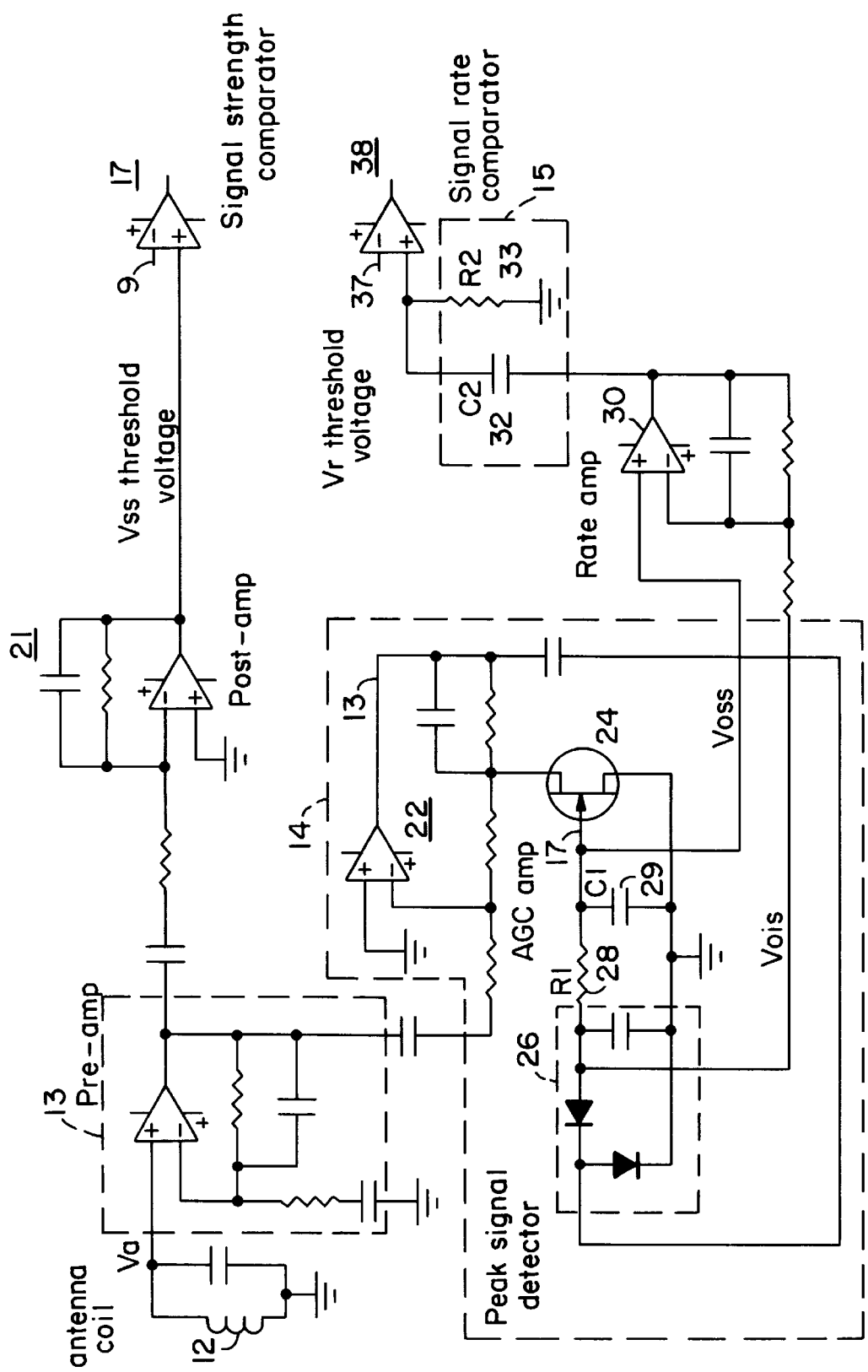
FIG. 9 illustrates the circuitry of the preferred embodiment which generates a stimulation signal in response to the change in detected current, as well as the level of detected current induced in the antenna coil 12.

The circuitry for providing the first and second stimulation signals in accordance with a preferred embodiment is more particularly described in FIG. 9. The antenna coil 12 is shown terminated in a capacitor which provides a resonance point about the frequency of the alternating current carried by the buried conductor. The amplifier 13 is shown as a conventional amplifier capacitor coupled to a post-amplifier 21. Amplifier 21 provides the voltage which represents the amplitude level of the voltage across the antenna coil 12. A first comparator 17 compares the amplitude of the sensed voltage to a reference voltage to provide a first stimulation signal when the received voltage exceeds the reference voltage.

The AGC amplifier 14, which may be optional and unnecessary in some applications, also receives the amplified signal from amplifier 13. The AGC amplifier is of conventional design, including an inverting operational amplifier 22 having as part of its feedback path FET 24. FET 24 is biased as a variable resistance element from a signal derived from peak detector 26. Peak detector 26 is connected through a low pass filter comprising resistor 28 and capacitor 29 to the control gate of the field effect transistor 24.

A rate amplifier 30 provides the signal from AGC amplifier 14 to a signal differentiator 15. Signal differentiator 15 includes a capacitor 32 and resistor 33, and provides a signal dv/dt as an input to comparator 38. Comparator 38 has a reference threshold input corresponding to a fixed value of dv/dt.

The AGC amplifier 14 has a time constant which is much slower than that of the differentiator circuit 15. Thus, instantaneous changes in signal level are differentiated by circuit 15, while long term amplitude changes are normalized through the action of AGC amplifier 14.

The circuitry of FIG. 9 provides first and second stimulation signals, either of which can be applied to the animal correction circuitry 18 to apply a corrective stimulus to the animal. The first of the stimulation signals represents the condition where the animal is approaching the boundary, with the antenna coil 12 in orientation with respect to the boundary conductor which results in a substantially maximum amount of flux coupling with the coil 12. The stimulation signal produced from comparator 38 represents the circumstance where the differential change in voltage through the antenna coil 12 is used to signify the animal's approach to the boundary when the coupling between the antenna coil 12 and magnetic flux is below the maximum value, either due to orientation of the antenna coil 12, or when the animal's approaching velocity increases, thereby resulting in an increase in the dv/dt function.

Thus, there has been described an improved apparatus and method for generating corrective stimulus to animals in an electronic confinement system.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An animal control device for keeping an animal within a boundary comprising:

an antenna coil worn by said animal for detecting an alternating current in a conductor buried along said boundary;

amplifier means for amplifying a voltage induced in said antenna coil; and rate detecting means for determining when a change in voltage across said antenna coil with time exceeds a predetermined value.

2. An animal control device for keeping an animal within a boundary according to claim 1 further comprising:

a signal amplitude detector connected to said amplifier means for determining when a voltage through said antenna coil exceeds a predetermined amplitude level, said signal amplitude detector providing a signal to said means for applying a stimulus, whereby said animal receives a stimulus when said change of voltage exceeds said rate or said amplitude exceeds said predetermined amplitude level, thereby minimizing the effect of orientation of said antenna coil.

3. The animal control device according to claim 1 further comprising an automatic gain amplifier means for averaging the magnitude of a signal from said amplifier means before applying said signal to said rate detecting means.

4. An animal control device for applying a stimulus to an animal as it approaches a boundary comprising:

an antenna coil which is worn by the animal for generating a voltage from a magnetic field which identifies said boundary;

a rate detector connected to said antenna coil for detecting the rate of approach of said animal to said boundary; and means for applying a stimulus to said animal when said rate of approach exceeds a predetermined level.

5. The animal control device according to claim 4 wherein said rate detector comprises a differentiator circuit connected to receive a voltage from said antenna coil which produces a signal representing said rate of approach.

6. The animal control device according to claim 5 further comprising a proximity detector for determining the relative distance of said animal to said boundary, said proximity detector being connected to said means for stimulating whereby said animal is stimulated if said animal approaches said boundary.

7. An animal control device for applying a stimulus to an animal when said animal approaches a boundary defined by a conductor which generates an alternating magnetic field comprising:

an antenna coil worn by said animal, said coil having a voltage output which varies as the orientation of said coil with respect to said conductor changes;

differentiation circuit means for determining the rate of change of said voltage induced in said antenna coil when said voltage amplitude is minimized due to said induction coil orientation with respect to said conductor;

amplitude circuit determining means for determining amplitude levels of said antenna coil voltage when the rate of change of said voltage is minimized due to said antenna coil orientation;

a first comparator means for generating a stimulation signal when said amplitude levels of said voltage exceed an amplitude reference level;

a second comparator means for generating a stimulation signal when said rate of change of said voltage produced by said antenna coil exceeds a rate of change reference level; and stimulation generation means for applying a stimulus to said animal when either said first or second comparator means generates a stimulation signal.

8. The animal control device according to claim 7 further comprising an automatic gain control circuit for maintaining the average level of voltage supplied to said second comparator means substantially constant.

9. The animal control device according to claim 7 further comprising power control circuitry for supplying power to said stimulation generation means when a stimulation signal is generated.

10. The animal control device according to claim 7 further comprising a third comparator for detecting when the rate of change of said voltage produced by said antenna coil exceeds a second rate of change reference level, and power control circuitry for applying power to said stimulation generation means for enabling the generation of a stimulus when said rate of change of said voltage exceeds said second rate of change reference level.

11. A method for controlling the proximity of an animal to a conductor which carries an alternating current signal comprising:

detecting a voltage induced by said conductor into an antenna coil worn by said animal;

determining the rate of change of said voltage;

comparing the rate of change with a reference rate of change; and generating a stimulus to said animal for correcting the behavior of said animal when said rate of change exceeds said reference rate of change.

12. The method for controlling the proximity of an animal to a conductor according to claim 11 further comprising:

detecting the level of voltage produced by said antenna coil;

comparing the level of voltage with a reference level of voltage; and generating a stimulus signal when the level of voltage exceeds said reference level of voltage.

13. The method for controlling the proximity of an animal according to claim 12 further comprising maintaining the voltage compared with said reference level at an average level with an AGC amplifier.

* * * * *